UNITED STATES PATENT OFFICE.

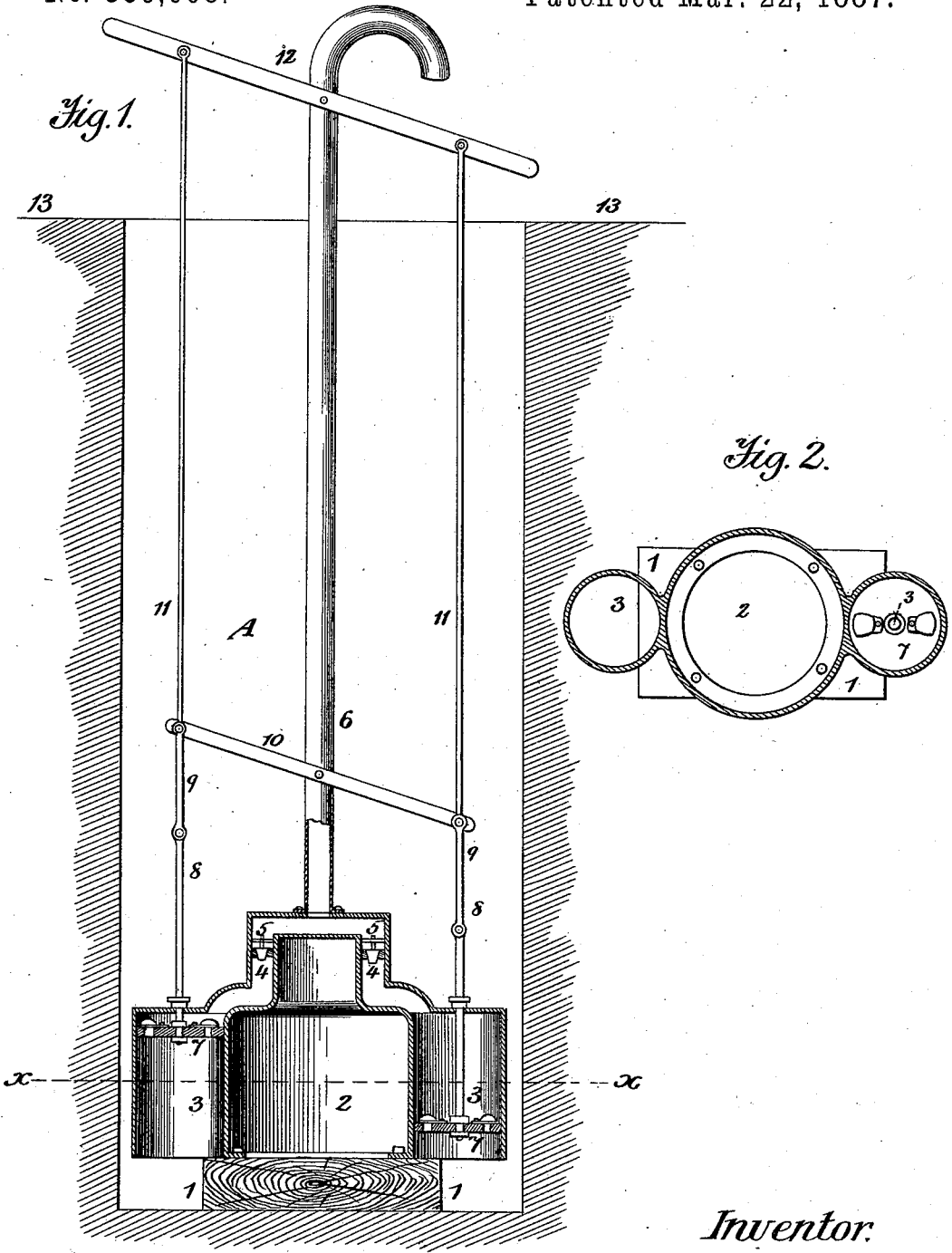

ALEXANDER EVANS CLARK, OF BUCKHOLTS, TEXAS.

DEEP-WELL PUMP.

SPECIFICATION forming part of Letters Patent No. 359,668, dated March 22, 1887.

Application filed November 16, 1886. Serial No. 219,073. (No model.)

*To all whom it may concern:*

Be it known that I, ALEXANDER EVANS CLARK, a citizen of the United States, residing at Buckholts, in the county of Milan and State of Texas, have invented certain new and useful Improvements in Deep-Well Pumps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention will first be described in connection with the drawings, and then pointed out in the claim.

Figure 1 of the drawings is a sectional elevation, and Fig. 2 a horizontal cross-section on the line $x\ x$ of Fig. 1.

In the drawings, A represents a deep well, in the bottom of which is placed a timber bed, 1. To the latter is bolted the pump-stock 2, in which are two opposite cylinders, 3 3, each of which leads through a neck, 4, valved with checks 5, to the pump-tube 6, up which the water ascends in the usual way and discharges at the mouth in the curved top end.

7 7 are the upwardly-valved pistons, provided with stems 8 8, connected by joints 9 with a lever, 10, which is fulcrumed at its middle on the pump-tube 6, each end of the lever being thus made to raise and depress one of the pistons 7 7. The ends of lever 10 are also connected by wires or pitmen 11 with a lever, 12, which is middle-pivoted to or near to the upper end of tube 6, and has each end extended to form a handle. 13 may represent the level or top surface of the soil.

Of course it is a matter of option whether two or one piston and connecting mechanism are employed; but I prefer two in order to afford and insure a continuous stream of water at the discharge end of the tube.

The jointed rods 9 9 enable the ends of lever 10 to take the arc line on which they travel with very little friction, while the connection of the cylinders by necks 4 4 with pipe 6 and the attachment of a median stock, 2, to the bed-piece 1 all together make up a device which is exceptionally strong and will last a long time without need of repair.

What I claim as new, and desire to protect by Letters Patent, is—

In a deep-well pump, the timber bed 1, arranged on the bottom of well, in combination with two superposed metallic cylinders connected by a stock, 2, said stock being provided at the bottom with inwardly-turned flanges made fast to said bed, as shown and described.

In testimony whereof I affix my signature in presence of two witnesses.

ALEXANDER EVANS CLARK.

Witnesses:
H. P. SANDEL,
W. S. WILLIAMSON.